United States Patent [19]

Wear et al.

[11] 4,264,058
[45] Apr. 28, 1981

[54] TRUCK BOLSTER RING RENEWAL SYSTEM

[76] Inventors: Charles W. Wear, 124 Chippewa Cir.; Robert J. Carl, 334 Shamrock, both of Gretna, Nebr. 68028

[21] Appl. No.: 112,943

[22] Filed: Jan. 17, 1980

[51] Int. Cl.³ .............................................. B23K 7/10
[52] U.S. Cl. ...................................... 266/70; 266/57; 266/72; 29/402.13; 29/402.08
[58] Field of Search .................... 228/5.1, 6 R, 13, 45, 228/119; 266/48, 54, 57, 70, 72, 73, 77, 71; 29/402.08, 402.13, 468

[56] References Cited

U.S. PATENT DOCUMENTS

| 974,798 | 11/1910 | Jacoby et al. | 266/70 |
| 1,900,682 | 3/1933 | Alcott | 29/402.13 |
| 4,150,815 | 4/1979 | Srp | 266/57 |

Primary Examiner—L. Dewayne Rutledge
Assistant Examiner—John P. Sheehan
Attorney, Agent, or Firm—Zarley, McKee, Thomte, Voorhees & Sease

[57] ABSTRACT

A mechanized truck bolster ring renewal system is described for cutting the worn bolster ring from a truck bolster and for welding a new bolster ring onto the truck bolster. A bolster clamp mechanism is pivotally mounted on a frame and includes means for centering the truck bolster as well as clamping the truck bolster thereon. A hydraulic cylinder is provided for pivotally moving the bolster clamp from a horizontally disposed position to a vertically disposed position. Apparatus is provided for permitting the selective rotation of the bolster clamp and the bolster thereon. A cutting torch is mounted on a horizontally movable arm and is moved in place adjacent the bolster ring. The cutting torch is ignited and cuts the ring from the truck bolster as the bolster clamp rotates. After the worn ring has been cut from the truck bolster, the torch assembly is removed from the horizontally extending arm with a ring mandrel being installed thereon. A new bolster ring is positioned on the ring mandrel and is positioned adjacent the truck bolster. The ring is tack welded in position and the horizontal arm is then retracted. The ring mandrel is removed from the horizontal arm and a welding torch is installed. The horizontal is then extended into position with welding torches then welding the inside and outside diameters of the ring to the truck bolster. When the welding is complete, the horizontal arm is retracted and the bolster clamp mechanism is lowered into its horizontal position and is removed therefrom.

15 Claims, 14 Drawing Figures

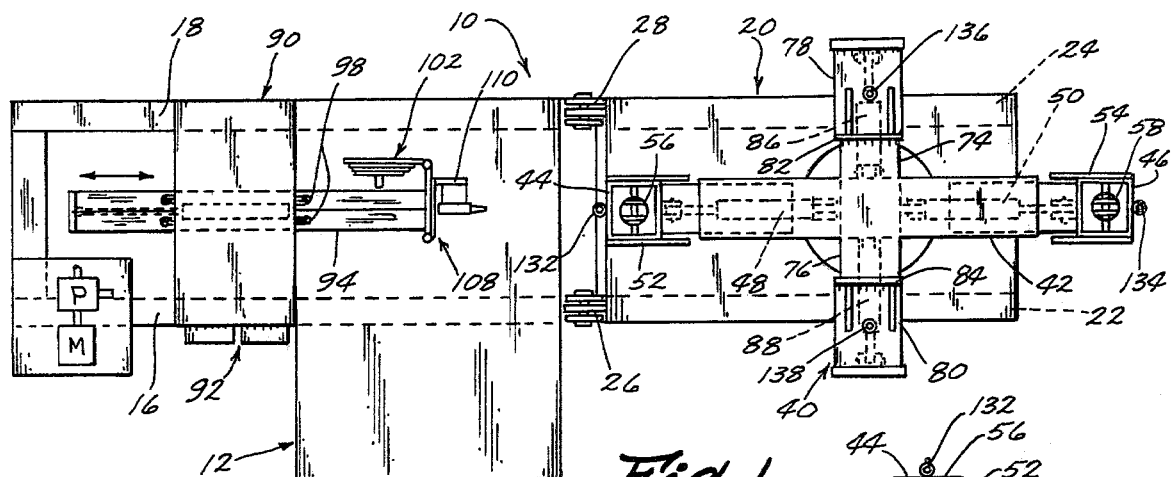
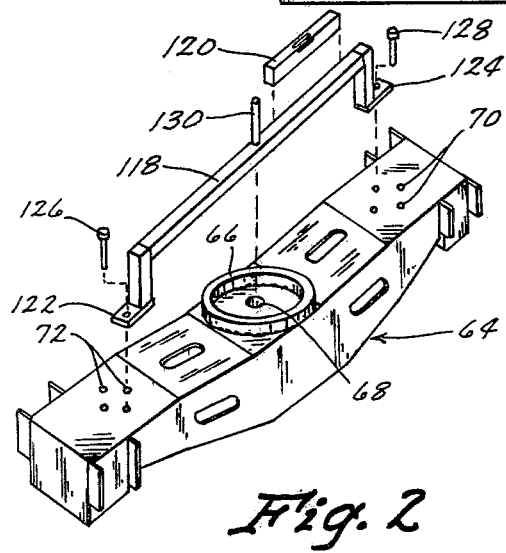
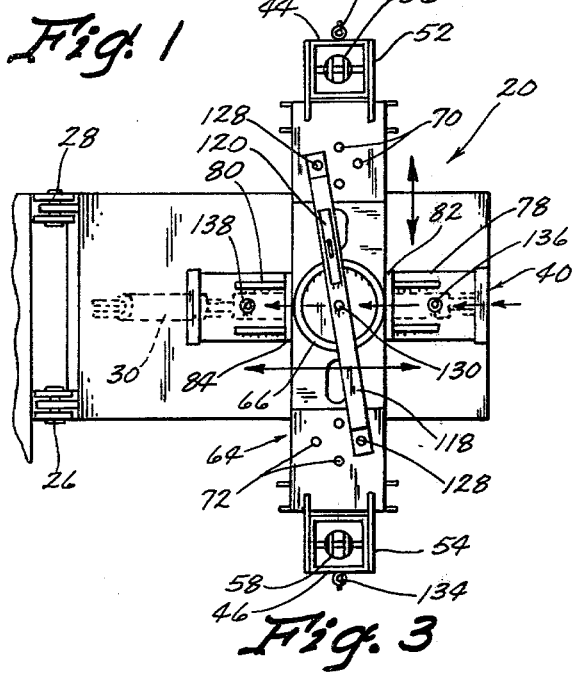
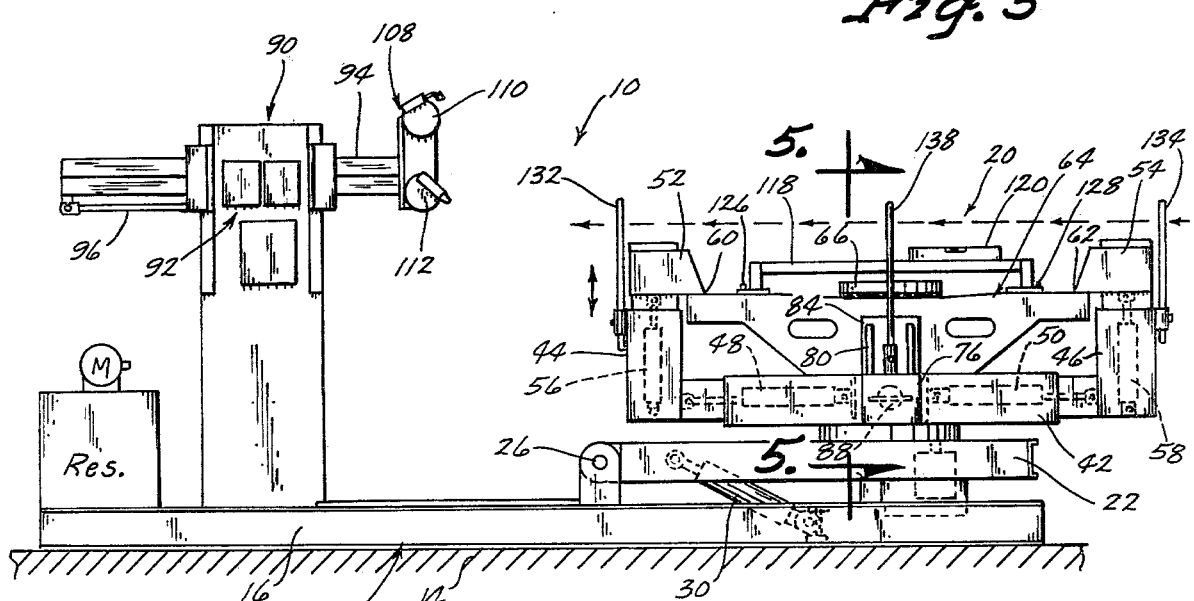

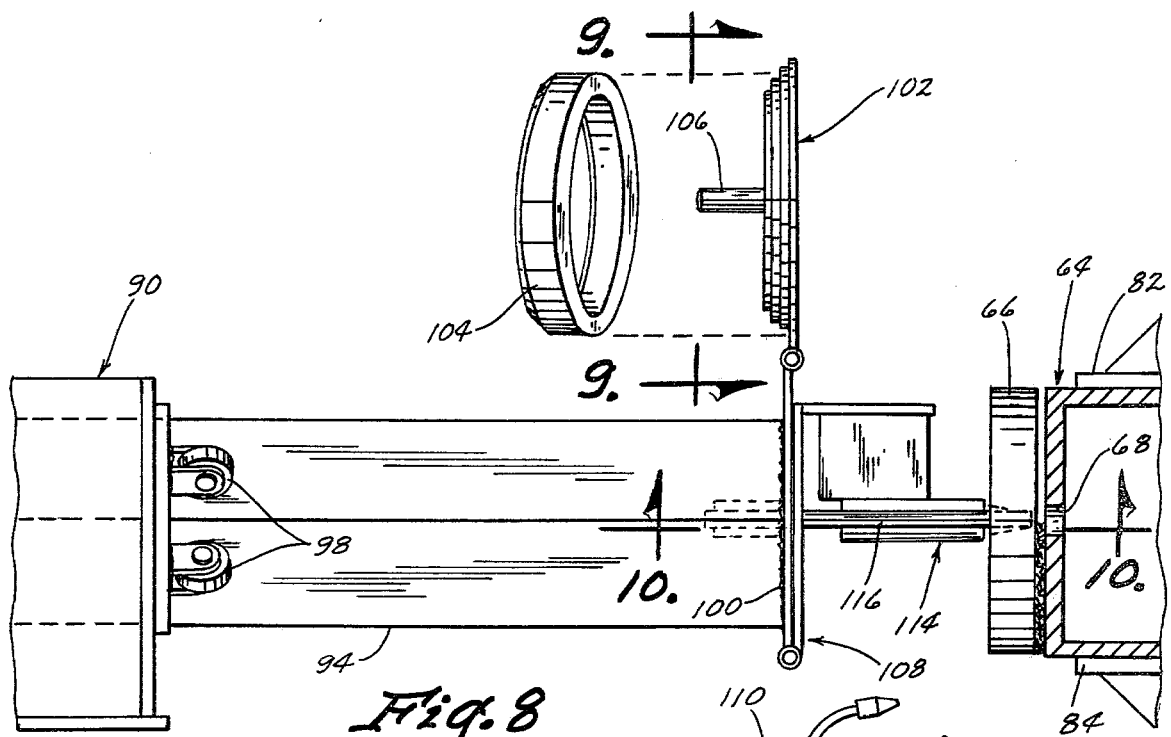
*Fig. 8*
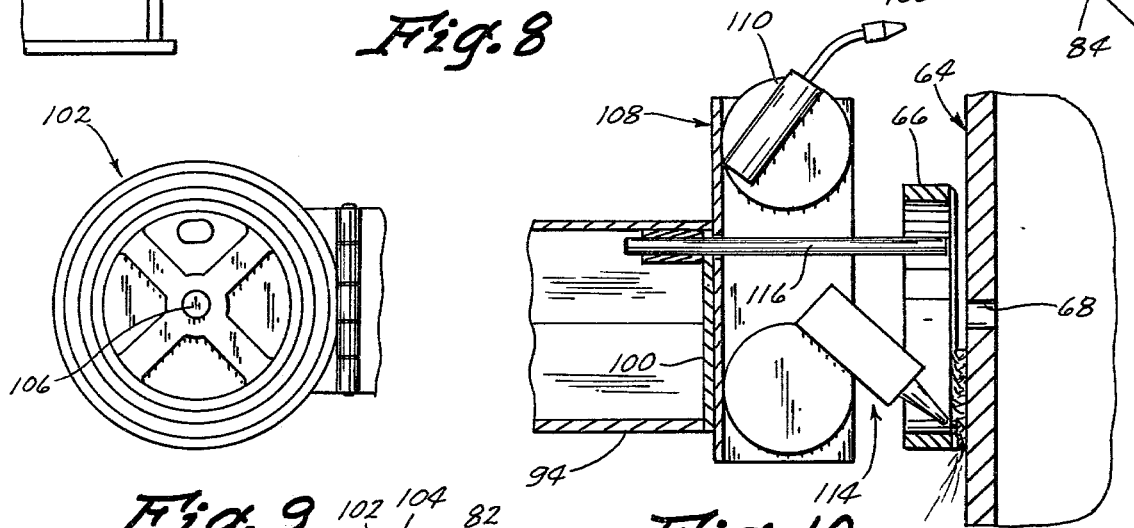
*Fig. 9*  *Fig. 10*
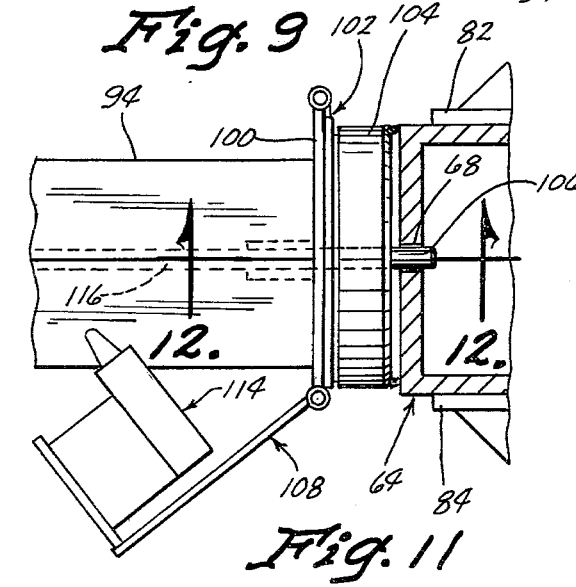
*Fig. 11*
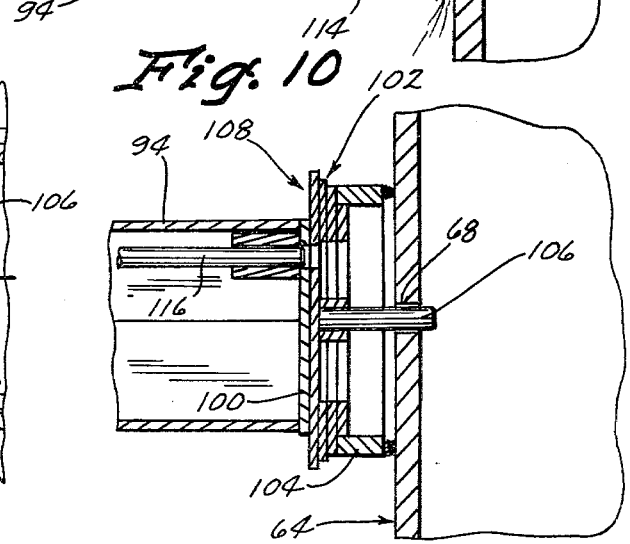
*Fig. 12*

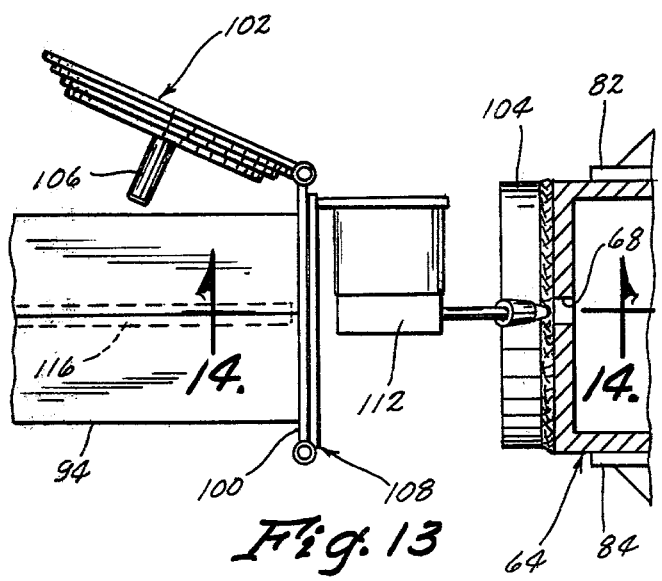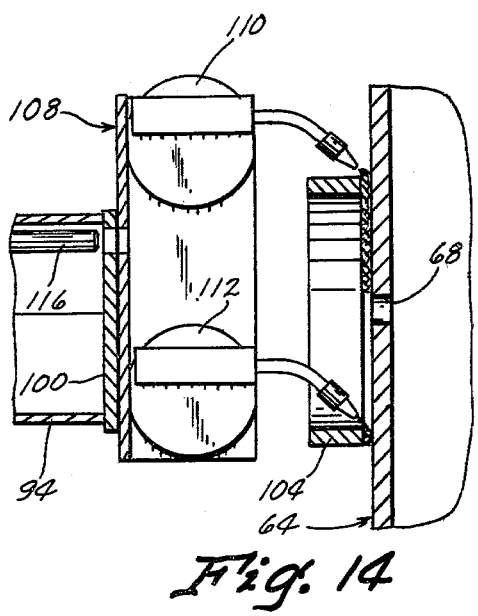

4,264,058

TRUCK BOLSTER RING RENEWAL SYSTEM

BACKGROUND OF THE INVENTION

Truck bolster form a part of the undercarriage of railroad cars. The truck bolsters include wear rings which must be periodically replaced. The customary practice is to first remove the truck bolster from the undercarriage and to then manually cut the worn ring from the truck bolster by means of a cutting torch. After the worn frame has been cut from the truck bolster, milling or grinding is ordinarily required. A new ring is then positioned on the truck bolster and welded thereto.

The manual cutting and welding operation just described does involve considerable time and expense. The manual cutting of the ring from the truck bolster necessitates considerable grinding or milling which thereby substantially increases the cost of the overall operation. Furthermore, the manual cutting and welding requires considerable time and labor.

Therefore, it is a principal object of the invention to provide a mechanized truck bolster renewal system.

A still further object of the invention is to provide a truck bolster ring renewal system including means for centering the bolster with respect to the cutting and welding torches.

A further object of the invention is to provide a truck bolster ring renewal system which substantially reduces the amount of time and labor ordinarily required to manipulate the bolster, remove the worn ring, locate and align the new ring and weld the same thereon.

A still further object of the invention is to provide a mechanized truck bolster ring renewal system which is extremely convenient to operate.

A still further object of the invention is to provide a mechanized truck bolster ring renewal system which is durable in use and safe to operate.

These and other objects will be apparent to those skilled in the art.

BRIEF DESCRIPTION OF THE DRAWINGS

FIG. 1 is a top elevational view of the system of this invention:

FIG. 2 is a perspective view of a truck bolster and the apparatus employed to center the bolster on the rotating fixture:

FIG. 3 is a top elevational view of the rotating fixture having the bolster clamped thereon:

FIG. 4 is a side elevational view of the apparatus having a truck bolster mounted thereon with the rotating fixture being in its horizontal position:

FIG. 8 is a view seen on lines 8—8 of FIG. 6:

FIG. 9 is a sectional view seen on line 9—9 of FIG. 8:

FIG. 10 is an enlarged sectional view seen on lines 10—10 of FIG. 8:

FIG. 11 is a view similar to FIG. 10 except that the new ring is being positioned by the ring mandrel:

FIG. 12 is a sectional view seen on lines 12—12 of FIG. 11:

FIG. 13 is partial sectional view illustrating the new ring being welded onto the truck bolster; and FIG. 14 is a sectional view seen on lines 14—14 of FIG. 13.

DESCRIPTION OF THE PREFERRED EMBODIMENT

Figure 5:
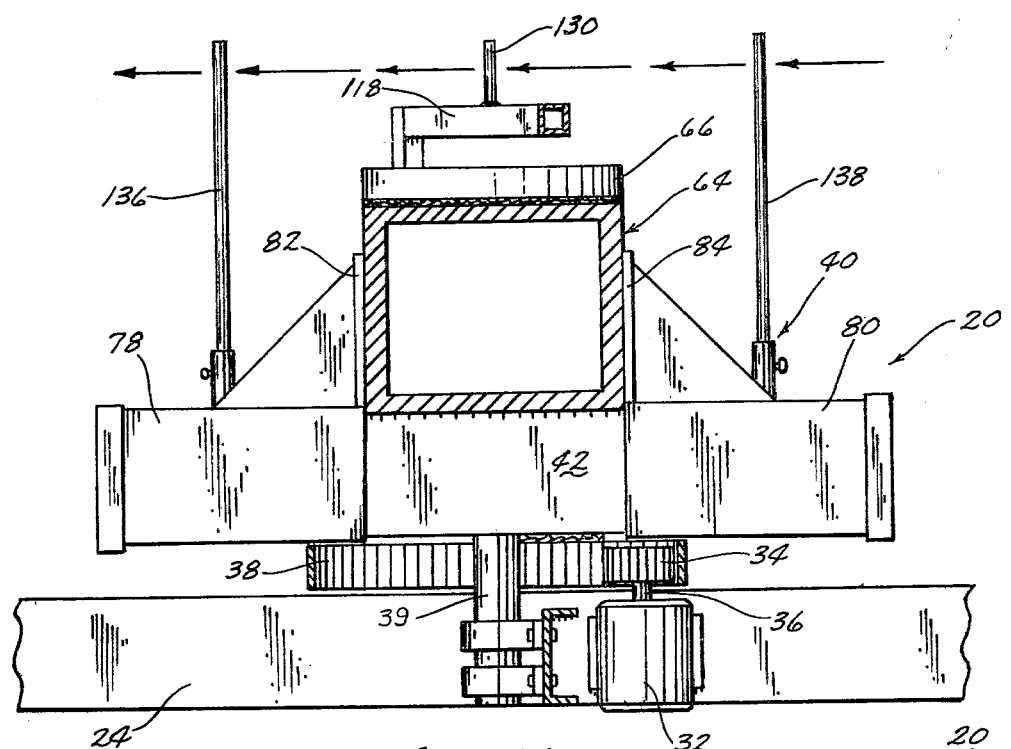
FIG. 5 is an enlarged sectional view seen on lines 5—5 of FIG. 4.

The numeral 10 illustrates the apparatus of this invention generally comprising a frame means 12 supported upon a floor 14 or the like. Frame means 12 generally comprises a pair of elongated beams 16 and 18. The numeral 20 refers to a bolster support including a pair of frames 22 and 24 which are pivotally connected to the beams 16 and 18 respectively at 26 and 28. Hydraulic cylinder 30 is provided between the frame means 12 and the support 20 for pivotally moving the support 20 from the horizontal position illustrated in FIG. 4 to the vertical position illustrated in FIG. 6.

Motor 32 is positioned below the frames 22 and 24 and has a gear wheel 34 mounted on its power shaft 36. Gear wheel 34 is in mesh with gear 38 which is rotatably supported on shaft 39 suitably rotatably mounted. Shaft 39 extends upwardly and has the bolster clamping assembly 40 mounted thereon for rotation therewith. Assembly 40 comprises a longitudinally extending box frame 42 having L-shaped members 44 and 46 slidably mounted therein. The members 44 and 46 are slidably moved longitudinally relative to the box frame 42 by means of hydraulic cylinders 48 and 50 which have one end connected to the box frame 42 and the other end connected to the L-shaped member. Clamps 52 and 54 are vertically slidably movably mounted in the L-shaped members 44 and 46 as illustrated in the drawings. Hydraulic cylinder 56 is provided and extends between the L-shaped member 44 and the clamp 52 for vertically moving the same. Likewise, hydraulic cylinder 58 is provided and extends between the L-shaped member 46 and the clamp 54 for selectively raising and lowering the clamp relative to the L-shaped member 46. Clamps 52 and 54 have inwardly extending shoulder portions 60 and 62 respectively which are adapted to engage the opposite ends of the truck bolster 64. Truck bolster 64 includes a wear ring 66 which is welded thereon at the center portion thereof. Bolster 64 also is provided with an opening 68 formed therein at the center of the wear ring 66. As seen in FIG. 2, bolster 64 is provided with a plurality of openings 70 and 72 formed therein at the opposite ends thereof.

The assembly 40 also comprises a pair of transversely extending supports 74 and 76 which extend laterally outwardly from the center of the box frame 42. Clamps 78 and 80 are slidably mounted on the supports 74 and 76 respectively and include upstanding portions 82 and 84 respectively which are adapted to engage the sides of the bolster 64. The clamps 78 and 80 are individually movably mounted on their respective supports by means of hydraulic cylinders 86 and 88.

Figures 6, 7:
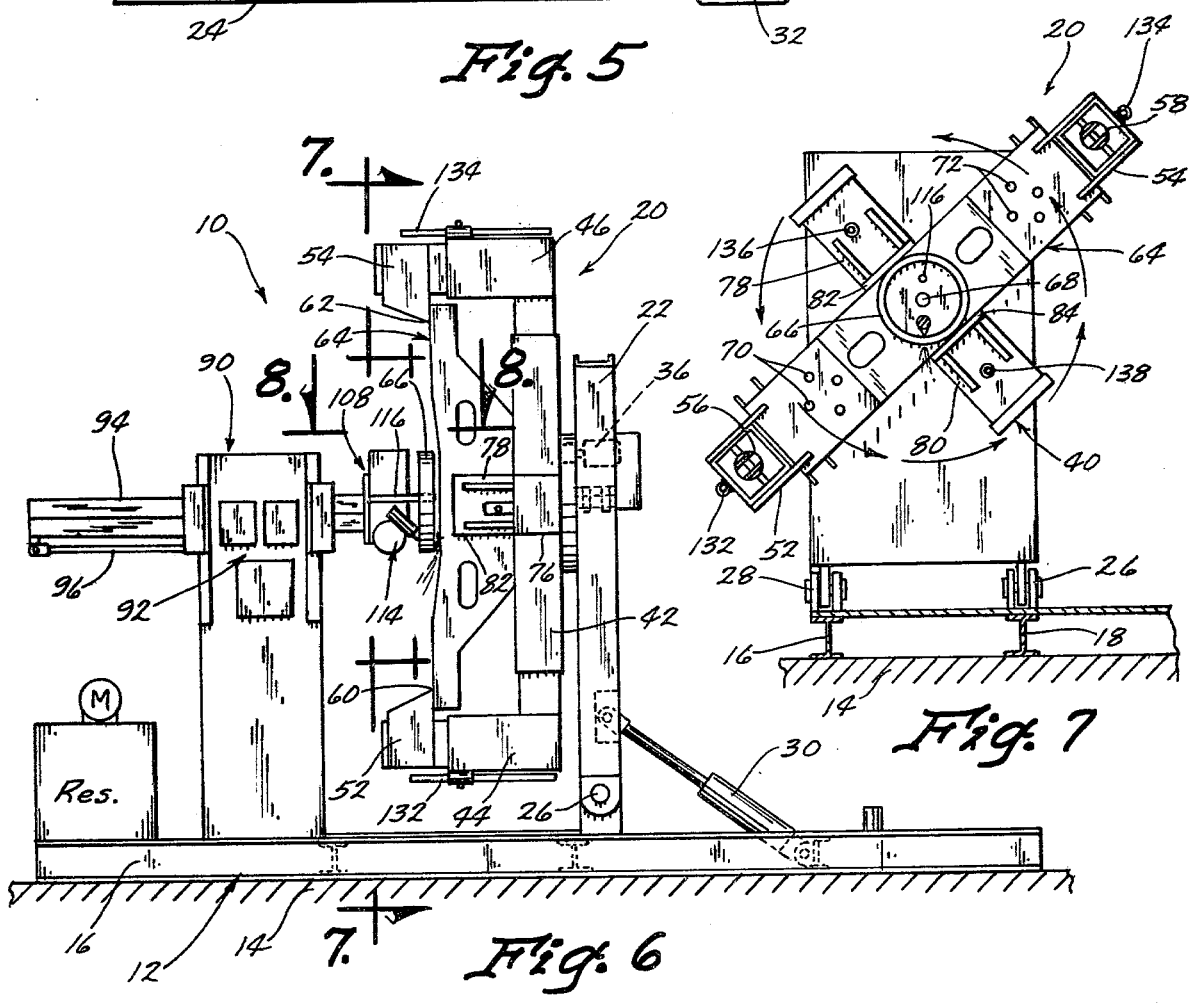
FIG. 6 is a view similar to FIG. 5 except that the rotating fixture has been moved upwardly to its vertically disposed position and the cutting torch being positioned adjacent the worn ring.
FIG. 7 is a sectional view seen on lines 7—7 of FIG. 6 illustrating the manner in which the truck bolster is rotated by the rotating fixture.

Referring to FIG. 6, the numeral 90 refers to an upstanding support having the control panel 92 provided thereon. Arm 94 is horizontally movably mounted on the support 90 by means of hydraulic cylinder 96. Rollers 98 are provided to assure the smooth extension and retraction of the arm 94 relative to the support 90. Plate 100 is welded to the outer end of the arm 94 as best illustrated in FIG. 8. Pivotally mounted at one end of the plate 100 is a mandrel 102 which is adapted to support the new wear ring 104 thereon as well be described in more detail hereinafter. Pin 106 extends outwardly from the mandrel at the center thereof. FIG. 8 illustrates the mandrel 102 in its inoperative or stored position.

Also pivoted to plate 100 is a torch support 108. Torch support 108 is illustrated in its operative position in FIG. 8 and it can be seen that it may be pivotally moved outwardly to an inoperative position as illustrated in FIG. 11. The support 108 is provided with a pair of conventional welding torches 110 and 112 mounted thereon. As stated, the torches 110 and 112 are conventional and includes means for adjusting the welding tips so that the tips may be moved upwardly and downwardly or from side to side. The lower welding torch 112 is removably mounted on the support 108 to permit a conventional cutting torch 114 to be positioned thereon. As best illustrated in FIG. 10, the outer end of the arm 94 is provided with a ring catcher or support 116 which is slidably mounted therein so that it may be moved from the position of FIG. 14 to the position of FIG. 10 and vice versa.

The operation of the hydraulic cylinders and the motor 32 is controlled from the operator's station as are the cutting and welding torches. Likewise, the tilting of the assembly 20 is also controlled from the operator's station. The sequence of operation is as follows. FIG. 1 illustrates the apparatus in its "ready" position. The hydraulic cylinders 48, 50, 86 and 88 are extended so that the various clamps are moved outwardly or opened to permit the bolster 64 to be lowered onto the apparatus with an overhead handling device. The bolster is initially positioned in an approximate centered position in the hopes that the opening 68 will be positioned precisely over the axis of rotation of the assembly. The bolster 64 is centered on the assembly by means of the gauge 118 and level 120 which are illustrated in FIG. 2. Gauge 118 includes shoes 122 and 124 at its opposite ends which are adapted to be removably secured to one of the openings 70 and 72 by means of pins 126 and 128. Gauge 118 also includes an upstanding pin at the center of its length. A pair of rods 132 and 134 are selectively vertically movably mounted on the L-shaped members 44 and 46 respectively and are raised to the position of FIG. 4 to aid in aligning or centering the bolster on the assembly. Rods 136 and 138 are also removably mounted on the clamps 78 and 80 as best illustrated in FIG. 5. Thus, once the bolster 64 is positioned on the assembly and the gauge 118 is in place, the operator will sight from one end of the assembly directly behind either of the rods 132 and 134. If pin 130 is aligned with the rods 132 and 134, the operator will know that the bolster is centered or aligned in one direction. If pin 130 is not in alignment with the rods 132 and 134, one of the hydraulic cylinders 86 and 88 is actuated to cause its respective clamp to engage one side of the bolster to push the bolster to one side until the pin 130 moves into alignment with the rods 132 and 134. The other clamp is then moved into loose engagement with the other side of the bolster. The operator then determines whether the bolster is centered on the assembly in a transverse direction by sighting along the rods 136 and 138 as illustrated in FIG. 5. If pin 130 is in alignment with the rods 136 and 138, the operator will know that the bolster is centered in that direction. However, if pin 130 is not in alignment with the rods 136 and 138, one of the cylinders 48 or 50 will be actuated so that the associated L-shaped member will engage the end of the bolster and will push the bolster longitudinally until the pin 130 is in alignment with the rods 136 and 138. The other L-shaped member is then moved into loose engagement with the other end of the bolster. The level 120 is then positioned on the gauge 118 to determine whether the bolster is mounted in a level position on the assembly. If the bolster is not level, one of the clamps 52 and 54 is actuated so that the shoulder 60 or 62 engages the end of the bolster to pull the same downwardly until the bolster is level. At that time, the other clamp is moved until its shoulder portion firmly engages the other end of the bolster. The side clamp which was previously placed into loose engagement with the bolster is then firmly positioned against the bolster. Thus, with the adjustments just described, the bolster is not only perfectly centered on the rotatable fixture but is also securely clamped thereto. At this time, the rods 132, 134, 136 and 138 are stored and the gauge 118 removed. The bolster is then ready to be manipulated so that the worn ring 66 may be removed therefrom.

The rotating fixture is then tilted into the vertical plane or position illustrated in FIG. 6. The cutting torch 114 is mounted on the torch support 108 and the horizontal arm 94 is extended towards the bolster. The cutting torch 114 is manually lit to preheat the edge of the ring. The oxygen lance is then initiated and the torch is manually adjusted until the tip thereof is positioned as illustrated in FIG. 10 so that the desired amount of the ring 66 will be removed. Motor 32 is then actuated to cause the assembly 40 to be rotated at a predetermined speed. At this time, the catcher 116 is moved from the position of FIG. 14 to the position of FIG. 10. The bolster is continued to be rotated until the ring 66 has been severed or cut from the bolster. As the ring 66 is severed from the bolster, the ring 66 falls therefrom and is caught by the catcher 116. Arm 94 is then retracted and the surface where the ring was removed is then prepared.

The support 108 is then pivotally moved from the position of FIG. 8 to the position of FIG. 11. A new ring 104 is placed on the mandrel 102 and the mandrel 102 is pivoted from the position of FIG. 8 to the position of FIG. 11. The arm 94 is again extended until the ring 104 is in position adjacent the bolster as illustrated in FIG. 11. The ring 104 is tack welded and the arm 94 is again retracted. Mandrel 102 is then pivoted from the position of FIG. 11 to the position of FIG. 8.

The plate 108 is then pivoted from the position of FIG. 11 to the position of FIG. 10 and welding torch 112 substitutes for the cutting torch 114. Arm 94 is then extended into the position illustrated in FIGS. 13 and 14. The welding torch position is fine adjusted using the axis slides in conventional fashion. The bolster is again rotated and each welding torch ignited. The welding proceeds with the operator adjusting the slides of the welding torches as required welding both the inside and outside diameters simultaneously. When the welding is complete, the torches 110 and 112 are deactivated and the rotation of the bolster is halted. The arm 94 is then retracted and the bolster moved to a horizontal position through the cylinder 30. The various clamps are then opened and the bolster is removed therefrom with the overhead handling device.

Thus it can be seen that a novel mechanized truck bolster ring renewal system has been provided which is fully mechanized. The apparatus of this invention not only provides a means for securely clamping the bolster thereon but also provides a means for centering the bolster with respect to the axis of rotation thereof to insure that the old ring will be properly removed therefrom and so that a new ring may be properly positioned on the bolster. It can also be seen that the apparatus of this invention will result in considerable savings in time and labor than with the old manual cutting and welding system. Not only does the invention provide a considerable savings in time and labor but also provides a considerable improvement in the quality of the ring replacement operation. The quality and penetration of the welding operation is improved over the conventional method due to the fact that the apparatus provides a continuous weld in both the inside and outside diameters of the ring simultaneously. Therefore, it can be seen that the apparatus accomplishes at least all of its stated objectives.

We claim:

1. An apparatus for cutting the bolster ring from a railway car bolster and for welding a replacement bolster ring thereon, comprising,
   a normally horizontally disposed bolster support means movable between its horizontally disposed position to a substantially vertically disposed position,
   first means for moving said bolster support means between its horizontally and vertically disposed positions,
   second means for removably maintaining a bolster on said bolster support means,
   third means for rotating said bolster support means and the bolster thereon about a horizontal axis when in its said vertically disposed position,
   a cutting torch support means positioned adjacent the bolster ring but spaced horizontally therefrom when the bolster support means is positioned in its vertically disposed position,
   a cutting torch mounted on said cutting torch support means for cutting the bolster ring from the bolster as the bolster is being rotated relative to said cutting torch by said third means,
   fourth means for horizontally and vertically adjusting said cutting torch support means so that said cutting torch will be properly positioned relative to the bolster ring to be removed from the bolster,
   and a welding means mounted on said cutting torch support means for subsequently welding the replacement bolster ring on the bolster.

2. The apparatus of claim 1 wherein said first means comprises a hydraulic cylinder means.

3. The apparatus of claim 1 wherein said second means comprises a plurality of hydraulic cylinder means.

4. The apparatus of claim 1 wherein said third means comprises a hydraulic motor.

5. The apparatus of claim 1 wherein said fourth means comprises at least a pair of hydraulic cylinders.

6. The apparatus of claim 1 wherein bolster centering means is provided on said bolster support means so that the bolster ring will be properly positioned relative to the axis of rotation of said bolster support means.

7. The apparatus of claim 6 wherein bolster leveling means is also provided on said bolster support means for leveling the bolster in a horizontal position relative to said bolster support means when said bolster support means is in its said horizontally disposed position.

8. The apparatus of claim 6 wherein said centering means comprises a pair of movable members at opposite ends of the bolster and a pair of movable members at opposite sides of the bolster, each of said movable members being individually operable for selective engagement with the bolster to move the bolster relative to said bolster support means.

9. The apparatus of claim 7 wherein said second means also comprises the means for leveling the bolster on said bolster support means.

10. The apparatus of claim 9 wherein said second means comprises a pair of individually movable clamping members adapted to selectively engage the upper opposite ends of the bolster to level the bolster and to maintain the bolster on said bolster support means.

11. An apparatus for cutting the bolster ring from a railway car bolster and for welding a replacement bolster ring thereon, comprising,
    a normally horizontally disposed bolster support means movable between its horizontally disposed position to a substantially vertically disposed position,
    first means for moving said bolster support means between its horizontally and vertically disposed positions,
    second means for removably maintaining a bolster on said bolster support means,
    third means for rotating said bolster support means and the bolster thereon about a horizontal axis when in its said vertically disposed position,
    a cutting torch support means positioned adjacent the bolster ring but spaced horizontally therefrom when the bolster support means is positioned in its vertically disposed position,
    a cutting torch mounted on said cutting torch support means for cutting the bolster ring from the bolster as the bolster is being rotated relative to said cutting torch by said third means,
    and fourth means for horizontally and vertically adjusting said cutting torch support means so that said cutting torch will be properly positioned relative to the bolster ring to be removed from the bolster,
    said cutting torch being removably mounted on said cutting torch support means and wherein a welding means is mountable on said cutting torch support means after the bolster ring has been cut therefrom to permit the replacement bolster ring to be welded to the bolster as said bolster support means is being rotated.

12. The apparatus of claim 11 wherein a pair of vertically spaced welding means is mountable on said cutting torch support means so that the inner and outer edges of the replacement bolster ring may be simultaneously welded.

13. The apparatus of claim 1 wherein a bolster ring catching apparatus is mounted on said cutting torch support means for catching the bolster ring after it has been cut from the bolster.

14. The apparatus of claim 11 wherein a replacement bolster ring support is mounted on said cutting torch support means for positioning the replacement bolster ring on the bolster during at least the initial welding of the replacement ring on the bolster.

15. The apparatus of claim 1 wherein the said cutting torch support means is mounted on a frame means, said bolster support means being operatively pivotally secured, about a horizontal axis, to said frame means.

* * * * *